United States Patent [19]
Lee et al.

[11] Patent Number: 5,821,519
[45] Date of Patent: Oct. 13, 1998

[54] BAR CODE SCAN STITCHING

[75] Inventors: Kuang-Yuu Lee, Lake Ronkonkoma; Glenn Spitz, Northport, both of N.Y.

[73] Assignee: Symbol Technologies, Inc., Holtsville, N.Y.

[21] Appl. No.: 824,074

[22] Filed: Mar. 24, 1997

Related U.S. Application Data

[63] Continuation of Ser. No. 293,725, Aug. 22, 1994, abandoned, which is a continuation-in-part of Ser. No. 127,900, Sep. 14, 1993, Pat. No. 5,457,308.

[51] Int. Cl.⁶ .................................................... G06K 7/10
[52] U.S. Cl. ...................... 235/462; 235/462; 235/463; 235/467
[58] Field of Search ................................ 235/462, 463, 235/467

[56] References Cited

U.S. PATENT DOCUMENTS

| | | | |
|---|---|---|---|
| 3,723,710 | 3/1973 | Crouse et al. | 235/463 |
| 3,938,089 | 2/1976 | McGregor et al. | 382/318 |
| 3,949,363 | 4/1976 | Holm | 382/140 |
| 4,059,224 | 11/1977 | Seligman | 235/462 |
| 4,075,461 | 2/1978 | Wu et al. | 235/466 |
| 4,239,151 | 12/1980 | Enser et al. | 235/437 |
| 4,251,798 | 2/1981 | Swartz et al. | 235/462 |
| 4,289,957 | 9/1981 | Neyroud et al. | 235/462 |
| 4,308,455 | 12/1981 | Bullis et al. | 235/462 |
| 4,329,574 | 5/1982 | Jordan, Jr. | 235/463 |
| 4,360,798 | 11/1982 | Swartz et al. | 235/463 |
| 4,369,361 | 1/1983 | Swartz et al. | 235/470 |
| 4,387,297 | 6/1983 | Swartz et al. | 235/462 |

(List continued on next page.)

FOREIGN PATENT DOCUMENTS

| | | |
|---|---|---|
| 0 072 910 | 3/1983 | European Pat. Off. . |
| 0 250 778 | 1/1988 | European Pat. Off. . |
| 0 304 804 | 3/1989 | European Pat. Off. . |
| 60-86661 | 5/1985 | Japan . |
| 1-133184 | 5/1989 | Japan . |

*Primary Examiner*—Don Wong
*Assistant Examiner*—Daniel St.Cyr
*Attorney, Agent, or Firm*—Fish & Richardson P.C.

[57] ABSTRACT

A method for combining decoded scan fragments of a bar code symbol composed of a delimited plurality of bar code elements representing an ordered sequence of data characters. The method includes scanning the symbol along a first scan path that includes a delimiter to obtain a first sequence of data characters; scanning the symbol along a second scan path that includes another delimited to obtain a second sequence of data characters; comparing the predetermined length of the lengths of the first and second sequences of data characters; and based on the comparison combining the first and second sequences to produce the ordered sequence of data characters. In a further version of the method, the first and second sequences are loaded into a stitching buffer, and a corresponding reliability or redundancy buffer is also maintained where information on the expected reliability of the individual decoded characters can be stored. The bar code symbol is considered properly decoded only if the information stored in the reliability buffer passes a series of tests.

9 Claims, 11 Drawing Sheets

U.S. PATENT DOCUMENTS

| | | | |
|---|---|---|---|
| 4,408,342 | 10/1983 | Grabowski et al. | 382/140 |
| 4,409,469 | 10/1983 | Yasuda et al. | 235/463 |
| 4,409,470 | 10/1983 | Shepard et al. | 235/472 |
| 4,421,978 | 12/1983 | Laurer et al. | 235/462 |
| 4,460,120 | 7/1984 | Shepard et al. | 235/472 |
| 4,488,678 | 12/1984 | Hara et al. | 235/463 |
| 4,496,831 | 1/1985 | Swartz et al. | 235/472 |
| 4,500,776 | 2/1985 | Laser | 235/462 |
| 4,593,186 | 6/1986 | Swartz et al. | 235/472 |
| 4,673,805 | 6/1987 | Shepard et al. | 235/472 |
| 4,717,818 | 1/1988 | Brookman et al. | 235/462 |
| 4,736,095 | 4/1988 | Shepard et al. | 235/472 |
| 4,746,789 | 5/1988 | Gieles et al. | 235/463 |
| 4,753,498 | 6/1988 | Saitoh et al. | 350/6.8 |
| 4,758,717 | 7/1988 | Shepard et al. | 235/472 |
| 4,760,248 | 7/1988 | Swartz et al. | 235/472 |
| 4,782,220 | 11/1988 | Shuren | 235/463 |
| 4,794,239 | 12/1988 | Allais | 235/462 |
| 4,896,026 | 1/1990 | Krichever et al. | 235/472 |
| 4,901,073 | 2/1990 | Kibrick | 341/13 |
| 4,916,297 | 4/1990 | Tukada et al. | 235/462 |
| 4,967,074 | 10/1990 | von Stein | 250/236 |
| 4,973,829 | 11/1990 | Ishida et al. | 235/462 |
| 5,028,772 | 7/1991 | Lapinski et al. | 235/463 |
| 5,045,677 | 9/1991 | Okamura | 235/462 |
| 5,124,538 | 6/1992 | Lapinski et al. | 235/467 |
| 5,155,343 | 10/1992 | Chandler et al. | 235/462 |
| 5,194,722 | 3/1993 | Mergenthaler | 235/463 |
| 5,241,164 | 8/1993 | Pavlidis | 235/462 |
| 5,262,625 | 11/1993 | Tom | 235/462 |
| 5,262,626 | 11/1993 | Goren et al. | 235/462 |
| 5,296,691 | 3/1994 | Waldron et al. | 235/462 |
| 5,444,231 | 8/1995 | Shellhammer | 235/462 |

SCAN 1
PD (CURRENT PARTIAL DECODE)

| 68 | 11 | 3A | 19 | 19 | 13 | 14 | 38 | 16 | 10 | 12 | 63 | 00 | 01 | 01 |

SB (STITCHING BUFFER)

| 68 | 11 | 3A | 19 | 19 | 13 | 14 | 38 | 16 | 10 | 12 | 63 | 00 | 01 | 01 | FF | FF | FF |

N

| 1 | 1 | 1 | 1 | 1 | 1 | 1 | 1 | 1 | 1 | 1 | 1 | 1 | 1 | 1 | 0 | 0 | 0 |

F

| 1 | 1 | 1 | 1 | 1 | 1 | 1 | 1 | 1 | 1 | 1 | 1 | 1 | 1 | 1 | 0 | 0 | 0 |

B

| 0 | 0 | 0 | 0 | 0 | 0 | 0 | 0 | 0 | 0 | 0 | 0 | 0 | 0 | 0 | 0 | 0 | 0 |

C

| 0 | 0 | 0 | 0 | 0 | 0 | 0 | 0 | 0 | 0 | 0 | 0 | 0 | 0 | 0 | 0 | 0 | 0 |

RB

| 81 | 81 | 81 | 81 | 81 | 81 | 81 | 81 | 81 | 81 | 81 | 81 | 81 | 81 | 81 | 00 | 00 | 00 |

AFTER SCAN 1, FSL= 15 AND BSL= 0

SCAN 2
PD

| 80 | 57 | 28 | 01 | 01 | 00 | 63 |

SB

| 68 | 11 | 3A | 19 | 19 | 13 | 14 | 38 | 16 | 10 | 12 | 63 | 00 | 01 | 01 | 28 | 57 | 80 |

N

| 1 | 1 | 1 | 1 | 1 | 1 | 1 | 1 | 1 | 1 | 1 | 2 | 2 | 2 | 2 | 1 | 1 | 1 |

F

| 1 | 1 | 1 | 1 | 1 | 1 | 1 | 1 | 1 | 1 | 1 | 1 | 1 | 1 | 1 | 0 | 0 | 0 |

B

| 0 | 0 | 0 | 0 | 0 | 0 | 0 | 0 | 0 | 0 | 0 | 1 | 1 | 1 | 1 | 1 | 1 | 1 |

C

| 0 | 0 | 0 | 0 | 0 | 0 | 0 | 0 | 0 | 0 | 0 | 0 | 0 | 0 | 0 | 0 | 0 | 0 |

RB

| 81 | 81 | 81 | 81 | 81 | 81 | 81 | 81 | 81 | 81 | 81 | C2 | C2 | C2 | C2 | 41 | 41 | 41 |

AFTER SCAN 2, FSL= 15 AND BSL= 7

SCAN 3
PD

| 80 | 57 | 28 | 01 |

SB

| 68 | 11 | 3A | 19 | 19 | 13 | 14 | 38 | 16 | 10 | 12 | 63 | 00 | 01 | 01 | 28 | 57 | 80 |

N

| 1 | 1 | 1 | 1 | 1 | 1 | 1 | 1 | 1 | 1 | 1 | 2 | 2 | 2 | 3 | 2 | 2 | 2 |

F

| 1 | 1 | 1 | 1 | 1 | 1 | 1 | 1 | 1 | 1 | 1 | 1 | 1 | 1 | 1 | 0 | 0 | 0 |

B

| 0 | 0 | 0 | 0 | 0 | 0 | 0 | 0 | 0 | 0 | 0 | 1 | 1 | 1 | 1 | 1 | 1 | 1 |

C

| 0 | 0 | 0 | 0 | 0 | 0 | 0 | 0 | 0 | 0 | 0 | 0 | 0 | 0 | 0 | 0 | 0 | 0 |

RB

| 81 | 81 | 81 | 81 | 81 | 81 | 81 | 81 | 81 | 81 | 81 | C2 | C2 | C2 | C3 | 42 | 42 | 42 |

AFTER SCAN 3, FSL= 15 AND BSL= 7

FIG. 14

SCAN 1
PD
| 68 | 11 | 3A | 19 | 19 | 13 | 14 | 38 | 16 | 10 | 12 | 63 | 00 | 01 | 01 |

SB
| 68 | 11 | 3A | 19 | 19 | 13 | 14 | 38 | 16 | 10 | 12 | 63 | 00 | 01 | 01 | FF | FF | FF |

N
| 1 | 1 | 1 | 1 | 1 | 1 | 1 | 1 | 1 | 1 | 1 | 1 | 1 | 1 | 1 | 0 | 0 | 0 |

F
| 1 | 1 | 1 | 1 | 1 | 1 | 1 | 1 | 1 | 1 | 1 | 1 | 1 | 1 | 1 | 0 | 0 | 0 |

B
| 0 | 0 | 0 | 0 | 0 | 0 | 0 | 0 | 0 | 0 | 0 | 0 | 0 | 0 | 0 | 0 | 0 | 0 |

C
| 0 | 0 | 0 | 0 | 0 | 0 | 0 | 0 | 0 | 0 | 0 | 0 | 0 | 0 | 0 | 0 | 0 | 0 |

RB
| 81 | 81 | 81 | 81 | 81 | 81 | 81 | 81 | 81 | 81 | 81 | 81 | 81 | 81 | 81 | 0 | 0 | 0 |

AFTER SCAN 1, FSL= 15 AND BSL= 0

SCAN 2
PD
| 80 | 57 | 28 | 01 | 01 | 00 | 61 |

SB
| 68 | 11 | 3A | 19 | 19 | 13 | 14 | 38 | 16 | 10 | 12 | FF | 00 | 01 | 01 | 28 | 57 | 80 |

N
| 1 | 1 | 1 | 1 | 1 | 1 | 1 | 1 | 1 | 1 | 1 | 0 | 2 | 2 | 2 | 1 | 1 | 1 |

F
| 1 | 1 | 1 | 1 | 1 | 1 | 1 | 1 | 1 | 1 | 1 | 0 | 1 | 1 | 1 | 0 | 0 | 0 |

B
| 0 | 0 | 0 | 0 | 0 | 0 | 0 | 0 | 0 | 0 | 0 | 0 | 1 | 1 | 1 | 1 | 1 | 1 |

C
| 0 | 0 | 0 | 0 | 0 | 0 | 0 | 0 | 0 | 0 | 1 | 0 | 0 | 0 | 0 | 0 | 0 | 0 |

RB
| 81 | 81 | 81 | 81 | 81 | 81 | 81 | 81 | 81 | 81 | 81 | 20 | C2 | C2 | C2 | 41 | 41 | 41 |

AFTER SCAN 2, FSL= 15 AND BSL= 7

SCAN 3
PD
| 80 | 57 | 28 | 02 |

SB
| 68 | 11 | 3A | 19 | 19 | 13 | 14 | 38 | 16 | 10 | 12 | FF | 00 | 01 | 01 | 28 | 57 | 80 |

N
| 1 | 1 | 1 | 1 | 1 | 1 | 1 | 1 | 1 | 1 | 1 | 0 | 2 | 2 | 1 | 2 | 2 | 2 |

F
| 1 | 1 | 1 | 1 | 1 | 1 | 1 | 1 | 1 | 1 | 1 | 0 | 1 | 1 | 1 | 0 | 0 | 0 |

B
| 0 | 0 | 0 | 0 | 0 | 0 | 0 | 0 | 0 | 0 | 0 | 0 | 1 | 1 | 1 | 1 | 1 | 1 |

C
| 0 | 0 | 0 | 0 | 0 | 0 | 0 | 0 | 0 | 0 | 1 | 0 | 0 | 1 | 0 | 0 | 0 |

RB
| 81 | 81 | 81 | 81 | 81 | 81 | 81 | 81 | 81 | 81 | 81 | 20 | C2 | C2 | E1 | 42 | 42 | 42 |

AFTER SCAN 3, FSL= 15 AND BSL= 7

FIG. 15

Initial loop index K to 0
Initial counter Diff to 0

Do
    Read the character (CHAR(K) from the current partial decode.
    IF current partial decode is forward THEN
       Set forward index i (i=K)
  Set F(i) to 1
    ELSE
       Set backward index i (i=X-1-K); X is the fixed character length
       Set B(i) to 1
    ENDIF
    IF SB(i) is empty THEN
       Save CHAR(K) to SB(i). (SB(i)=CHAR(K)
       Increase the number of decodes N(i) by 1 (N(i)=N(i)+1
    ELSE
         IF (SB(i) is not equel to CHAR(K) THEN
            Set C(i) to 1; different char found
            Update Diff (Diff=Diff+1)
            IF (N(i) is less than 1) THEN
                SB(i)=Empty Char (0xFF)
                F(i)=0; clean forward decode direction
                B(i)=0: clean backward decode direction
                N(i)=0
            ELSE (Decode more than once)
                N(i)=N(i)-1
            ENDIF
         ELSE
            Increase the number of decodes N(i) by 1 N(i)=N(i)+1
         ENDIF
       ENDIF
       Increase loop index (K) by 1 in order to get the next CHAR(K)
  UNTIL K is equal to Ls (the length of current partial decode)
  IF DIFF is greater than 2 THEN (too many different chars found)
    Reset SB(i),F(i),C(i),B(i) and N(i); .For safety reason
    QUIT
  ELSE
    Done
  ENDIF

FIG. 16

BAR CODE SCAN STITCHING

This is a continuation of application Ser. No. 08/293,725, filed Aug. 22, 1994, now abandoned, which is a continuation-in-part of U.S. Ser. No. 08/127,900, filed Sep. 14, 1993 now U.S. Pat. No. 5,457,308.

BACKGROUND OF THE INVENTION

This invention relates to bar code scanning, and in particular to techniques for combining, or stitching, partial scans.

A bar code symbol is a coded pattern of indicia comprising a series of bars and spaces having different light reflecting characteristics. Bar code scanning systems electro-optically transform the indicia into electrical signals, which are decoded into alphanumerical characters. Characters are typically represented in digital form and are provided as an input to a data processing system for applications, such as point-of-sale processing and inventory control. Scanning systems of this general type have been disclosed, for example, in U.S. Pat. Nos. 4,251,798; 4,369,361; 4,387,297; 4,409,470; 4,760,248; and 4,896,026, all of which have been assigned to the same assignee as the instant application.

Bar code symbols are formed from a series of bars and spaces, called elements, which have a variety of possible widths. The specific arrangement of elements defines the character represented according to a set of rules and definitions. To encode a desired sequence of characters, groups of elements are concatenated to form a bar code symbol, with each character of the message represented by a corresponding group of elements. In some symbologies a "start" and "stop" character is used to indicate where the bar code begins and ends. There are a number of symbologies in use, for example, UPC/EAN, Code 39, Code 128, Coda bar, and Interleaved 2 of 5.

In typical scanning systems, a light source, such as a laser or laser diode, produces a beam which is directed by a lens or similar optical components along a light path toward a target that includes a bar code symbol on the surface. The beam produces a spot on the target. To scan with a laser system, the spot may be deflected by a mirror that is moved with an oscillating or rotating motor to produce a line or series of lines or curved paths across the symbol. Alternately, the light may be deflected by holographic or other means. A portion of the light that is reflected off the symbol is detected by a sensor which may be positioned in the scanner. The sensor converts the reflected light into an electrical signal which is converted to a digital representation by electronic circuitry. For example, an analog electrical signal from the photodetector may be converted into a pulse width modulated digital signal, with pulse widths corresponding to the physical widths of the bars and spaces.

The decoder receives the pulse width modulated digital signal from the scanner, and attempts to decode the scan. If the start and stop characters and all of the characters between them are decoded successfully, the decoding process is finished. Otherwise, the decoder receives a next scan and attempts to decode it. Each attempt is based on the signal received during a single scan. The process continues until a scan is completely decoded or until no more scans are available.

A scan line or series of scan lines may not always entirely cross the bar code symbol. For example, a scanner may be in a fixed position next to a conveyor with containers, each of which has a bar code symbol printed on a label. If the label is skewed with respect to the scan line, there may be no single scan line which includes both the start and stop characters. These incomplete scan lines, called fragments, were discarded until techniques were developed to stitch or combine the fragments together, so that the decoding process can be completed.

Several basic techniques have been employed to combined fragments. One technique, known as block decoding, involves combining predefined regions or blocks in a number of scans. For example, a symbology such as UPC has start, stop, and center characters. If one fragment includes a start and a center, and another fragment includes a center and stop, these two "blocks" can be combined to form a complete scan.

In another method, a system checks fragments for corresponding portions, and stitches by superimposing. For example, the widths of elements can be measured in clock pulses for two fragments. These widths may be converted to a binary representation of widths or of ratios of widths between successive elements. The pulse count or other representation of the width of an element in one scan is compared to the width of an element in another scan. If these are the same or sufficiently similar, adjacent elements are compared. If a group of elements of a certain length are the same, the two groups of elements are considered to be corresponding, and the two fragments of decoded data characters are stitched by superimposing the common portions.

In yet another method, for example shown in U.S. Pat. No. 4,488,678, using bar codes of a known number of bars, bar codes are combined at the bar level, that is, at the pre-decoded level, for subsequent decoding.

SUMMARY OF THE INVENTION

In general the invention features combining two decoded scan fragments of a bar code symbol using a character level technique. The bar code symbol is composed of bar code elements which represent an ordered sequence of data characters delimited by a "start" character on one end and a "stop" character on the other. The bar code is scanned and the fragments are decoded until a fragment with the "start" character and another with the "stop" character are found. Then, the two fragments are combined to form the required ordered sequence of data characters.

In some preferred embodiments, the ordered sequence is of a predetermined character length. The character length of the fragments is compared to the predetermined character length, and the fragments are combined if the sum of the lengths of the fragments is equal to the predetermined length. If the sum of the fragment lengths is greater than the predetermined length, then the overlapping portions of the segments are compared, and, if the corresponding data characters of the overlapping portions match, then the fragments are combined by overlapping the matching portions to form the required ordered sequence of data characters.

If the sum of the fragment lengths is less than the predetermined length, or if the overlapping portions do not match, then new sequences of characters are scanned and the process is repeated.

In another aspect of the invention, when overlapping data characters do not match, the data characters from the segment which was scanned the most times (or most recently) are used.

In yet another aspect of the invention, the predetermined character length is obtained by decoding scans containing full crossings (including the "start" and "stop" characters) of a representative bar code of the predetermined character length, and then storing and saving that character length for subsequent use.

In other preferred embodiments, the ordered sequence encodes a checksum value. The fragments are combined and their checksum value is determined and compared to the encoded checksum value. Based on the comparison, if the checksum value of the combined fragments is equal to the encoded checksum value, then the first and second fragments are combined to produce the required ordered sequence of data characters.

In yet other preferred embodiments, the method computes the probability that the combined fragments form a valid data character sequence. If this probability is greater than some predetermined acceptable probability, then the first and second fragments are combined to produce the required ordered sequence of data characters.

In another aspect of the invention, the fragments to be matched are restricted to only those fragments which are scanned within a predetermined acceptable period of time.

In another aspect of the invention, the fragments to be matched are restricted to only those fragments which are scanned in a direction consistent with each other and the physical scan pattern.

According to yet another aspect of the present invention, there is provided a method for combining decoded scan fragments of a bar code symbol composed of a plurality of bar code elements representing an ordered sequence of characters, the ordered sequence having a predetermined length and having a location character whose position within the sequence is known, the method comprising the steps of:

(a) providing a stitching buffer, the stitching buffer having a plurality of cells, each cell being arranged to contain a value representative of a character in the ordered sequence;

(b) providing a reliability buffer having a plurality of cells, each cell in the reliability buffer corresponding to a cell in the stitching buffer, and each cell in the reliability buffer being arranged to contain a value representative of the expected reliability of the value contained in the corresponding stitching buffer cell;

(c) scanning the symbol along a scan path and decoding the scan elements to obtain a decoded sequence of characters; and repeating the scanning and decoding until a decoded sequence is obtained which includes the location character;

(d) loading the decoded sequence into the stitching buffer in a sequence of location dependent upon the known position of the location character within the ordered sequence; and storing reliability information in those cells of the reliability buffer which correspond to the sequence of locations in the stitching buffer;

(e) scanning the symbol along a scan path and decoding the scan elements to obtain a further decoded sequence of characters; and repeating the scanning and decoding until a further decode sequence is obtained which includes the location character;

(f) determining from the known position of the location character within the ordered sequence, a further sequence of locations within the stitching buffer corresponding to the further decoded sequence and, for each character in the further decoded sequence; dependent upon the reliability information in the corresponding reliability buffer cell, storing a value representative of the character in the corresponding stitching buffer cell or updating the cell or not updating the cell; and updating the reliability information;

(g) repeating steps (e) and (f) until each cell in the stitching buffer contains a value representative of a decoded character; and (h) when each cell in the stitching buffer contains a value representative of a decoded character, determining whether the decoded characters correspond to the said ordered sequence, at least partially according to the information stored in the reliability buffer.

Preferably, the reliability buffer is used to store redundancy information, such as the number of times the corresponding character in the stitching buffer cell has been decoded in the same way. The reliability buffer may further store a flag which is arranged to be set when the character of the corresponding stitching buffer cell has been decoded at least once as a result of a scan path in a forward direction. Each cell may also include a further flag which is set when the character of the corresponding stitching block cell has been decoded at least once as a result of a scan path in a backward direction. The reliability buffer also may store a conflict flag which can indicate whether there is any different character that has been decoded in the same cell position. The reliability buffer may consist of a number of individual buffers, such as a number redundancy buffer, a forward flag buffer, a backward buffer and a conflict buffer. Alternatively, all of the information may be stored, in suitably coded form, in a single reliability/redundancy buffer.

In the preferred form of this embodiment, repeated scans are loaded into the stitching buffer either in a forward direction or in a backward direction, depending on whether the corresponding decoded sequences contain a start character or an end (stop) character. As certain elements in the bar code symbol are repeatedly scanned, the redundancy information in the redundancy buffer builds up, providing details of how often each individual character has been decoded. If, on one individual scan, a particular character is decoded to a different value from that to which it was decoded previously, the number stored in the redundancy buffer may be decremented.

The forward, backward and conflict flags, stored in the reliability/redundancy buffer, may either be logical true or false values, or alternatively they may be integer values. For example, it may in some circumstances be desirable to keep a record of the number of times in which a character has been decoded as a result of a scan in a forward direction, and the number of times it has been decoded as a result of a scan in a backward direction.

The method includes the step of determining whether the decoded characters correspond to the ordered sequence (and hence whether the bar code symbol has correctly been decoded), at least partially according to the information stored in the reliability buffer. In the preferred embodiment, the bar code symbol is considered to have been correctly decoded only if all of a sequence of security checks are passed. For example, there may be a requirement that each character in the overlap area must have been decoded in the same way at least twice, once in the forward direction and once in the backward direction. For this purpose, the overlap area is defined as those characters which are common to the longest decoded sequence containing a start character and the longest decoded sequence containing the end character.

This embodiment provides a reliable method of decoding a bar code label, using stitching. Since the security level is programmable, and the user can set any level he wants, there may be a large amount of flexibility. The in built character redundancy is found in practice to eliminate most character level decode problems.

Other features and advantages will become apparent from the following description of the preferred embodiments and from the claims.

BRIEF DESCRIPTION OF THE DRAWINGS

FIGS. 14 and 15 are diagrams illustrating how the method of FIGS. 12 and 13 works in practice; and FIG. 16 shows an exemplary generic code corresponding to the diagram of FIG. 13.

DESCRIPTION OF THE PREFERRED EMBODIMENTS

Figure 1:
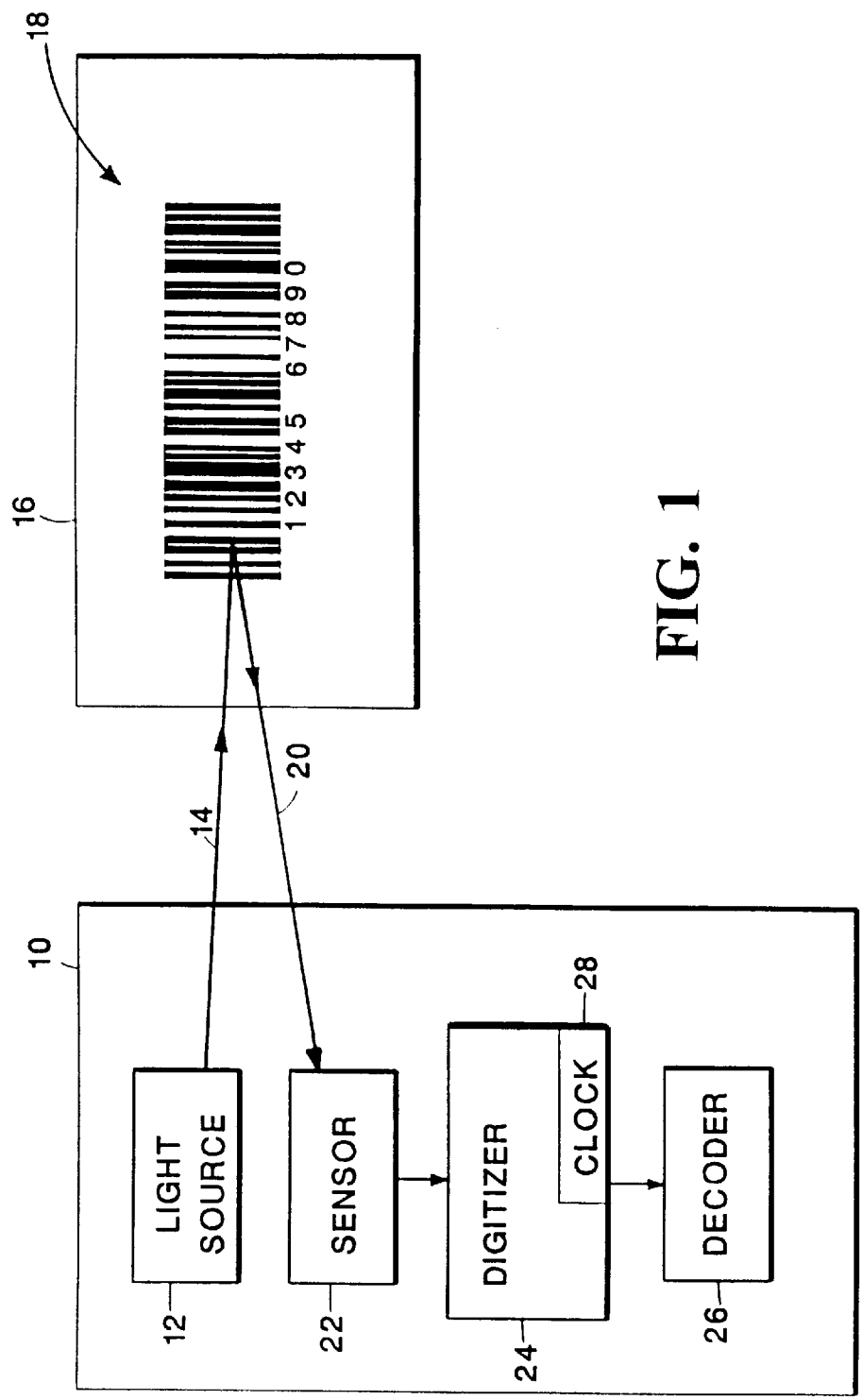
FIG. 1 is a block diagram of a scanning system.

Referring to FIG. 1, scanning system 10 is used to read and interpret bar code symbols. Light source 12 directs a beam of light 14 at bar code 18 which is printed or affixed on target 16. Bar code symbol 18 reflects diffused light 20 which is received by sensor 22. The sensor produces an analog signal which indicates how much light is received from the reflected beam as the beam scans the bar code. The analog signal is digitized by digitizer 24, and the resulting digital signal is sent to a decoder 26. The digital signal consists of a series of pulse width values, each representative of the time it took for the scan to cross an element. The time is determined by clock 25 which counts cycles beginning on a leading or falling edge of the digital signal. A representation of the time that each element is scanned is stored so that a set of discrete integers represents the pulse widths of elements in the time domain. Decoder 26 converts the digital signal to a series of alphanumeric characters according to algorithms specific to the symbology used.

Figure 2:
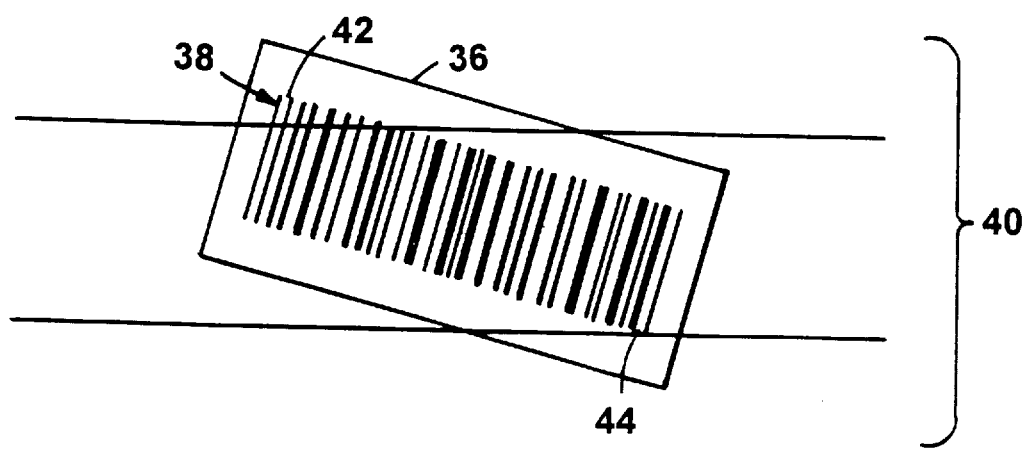
FIGS. 2 and 4 are pictorial representations of bar codes and scan fragments.

In some cases, the bar code cannot be completely read with a single scan line. Referring to FIG. 2, bar code symbol 38 is printed on label 36. The symbol includes data characters, a start character 42, and a stop character 44. Scan lines 40 are horizontal, but the label is skewed so that no single scan line passes through both start character 42 and stop character 44. Scan lines 40 are therefore all fragments. While no scan has all the elements, each element can be determined from at least one scan line.

Figure 4A:
Figure 5:
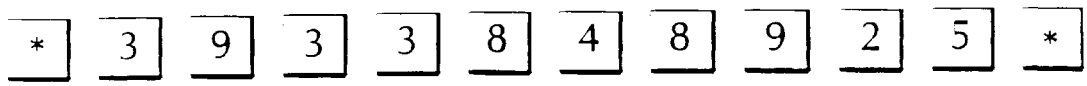
FIG. 5 is a representation of the data represented by the bar code of FIG. 4.

The sequence of data characters represented in FIG. 5 (the characters "*" on either end of the sequence are the start and stop delimiter characters) can be represented, for example, by bar code symbol 56 shown in FIG. 4(a). (Alternatively, a correct decoding of the bar code symbol in FIG. 4(a) should produce the sequence of data characters represented in FIG. 5.)

Figure 4B:
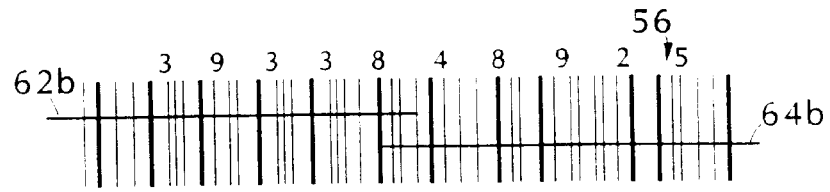
Figure 4C:

The examples in FIGS. 4(a)–(c) show three possible outcomes of two partial scans 62 and 64.

The two partial scan fragments 62a and 64a in FIG. 4(a) together cross every element of bar code 56. These two scan fragments also partially overlap for some bar code elements (and for some data characters). Scan fragment 62a covers data characters "3933848", and scan fragment 64a covers data characters "848925". These partial scans overlap on data characters "848". It should be noted that while scan 62a covers some elements of the data character "9" at its right-most end, it does not cover enough elements to decode that character. Similarly, while scan 64a covers some elements of the data character "3" at its left-most end, it too does not cover enough elements to decode that character.

The two partial scan fragments 62b and 64b in FIG. 4(b) also cross every element of bar code 56, and they also overlap for some elements, but they do not overlap for any data characters. Scan fragment 62b covers data characters "39338", and scan fragment 64b covers data characters "48925".

In FIG. 4(c) the two partial scans 62c and 64c do not cover the entire symbol 56 and do not overlap. Scan fragment 62c covers only data characters "39338", and scan fragment 64c covers only data characters "8925". Neither scan covers the data character "4".

Figure 6:
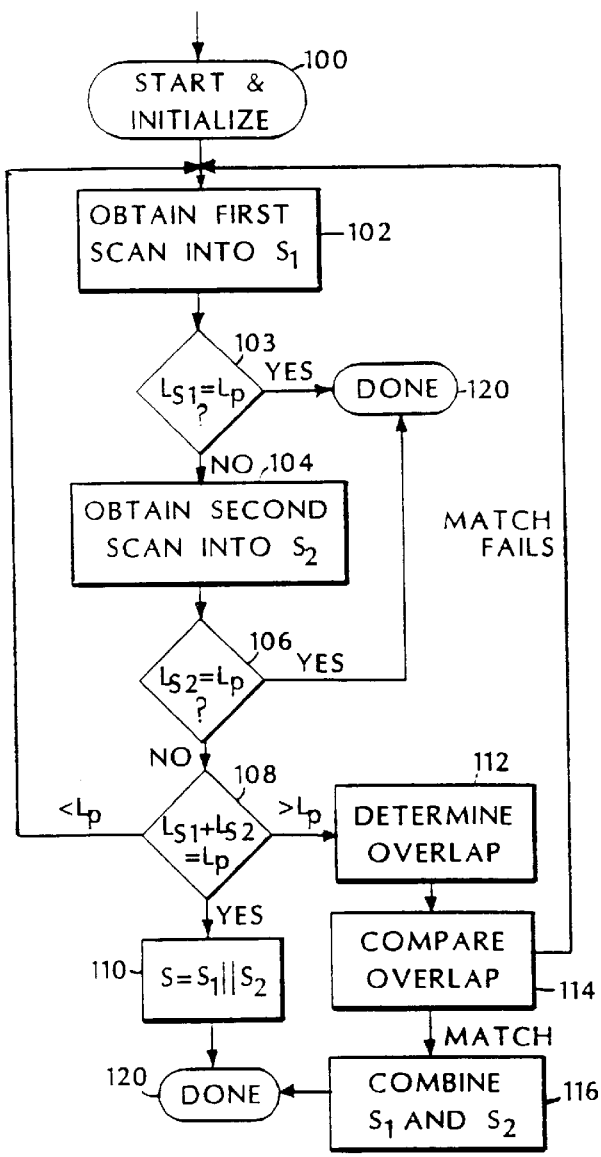
FIGS. 6–11 are flow charts of a preferred embodiments.

In one embodiment, referring to FIG. 6, a method for combining or stitching two decoded partial scans begins with setting various global variables, such as the required or expected predetermined length, $L_p$, of the expected scan. Note that the length $L_p$ is the expected or required number of data characters encoded by the bar code symbol, and not the number of elements in the symbol itself. Thus, for example, the length of symbol 56 in FIG. 4(a) is ten (excluding delimiter characters).

After the initializing step 100, the sequence of data characters, $S_1$, corresponding to first decoded partial scan, is obtained at 102. The length of the sequence $S_1$ is compared at 103 to the expected predetermined length, $L_p$, to determine whether or not a complete scan was achieved. If so, then processing is complete at 120, otherwise a second sequence of data characters, $S_2$, corresponding to a second decoded partial scan, is obtained at 104.

Note that both $S_1$ and $S_2$ are sequences of data characters corresponding to decoded partial scans. The lengths of the sequences $S_1$ and $S_2$, designated $L_{S1}$, and $L_{S2}$ respectively, are the number of data characters in the sequences.

As was the case with the first scan $S_1$, the length of the second data character sequence $S_2$ is compared at 106 to the expected predetermined length, $L_p$, to determine whether or not a complete scan was achieved. If so, then processing is complete at 120, otherwise processing continues to determine whether the two sequences can be combined.

The next step 108 compares the combined lengths, $L_{S1}+L_{S2}$, of the two partial sequences $S_1$ and $S_2$, to the expected length, $L_p$. Since at this point neither sequence is a complete scan, one of the three situations depicted in FIGS. 4(a)–(c) has occurred.

If the combined lengths are less than the expected length, corresponding to the case shown in FIG. 4(c), then the system attempts to obtain another first scan at 102. If the combined lengths are the same as the expected length, corresponding to the case shown in FIG. 4(b), then the two sequences are combined at 110, for example, by concatenating them, and processing is completed at 120.

In the case where the combined lengths exceed the expected length, corresponding to the case shown in FIG. 4(a), the amount of overlap is determined at 112 and the overlapping portions of the sequences are compared at 114. If the overlapping portions match each other, then the two sequences are combined at 116 and processing is completed at 120, otherwise, the process is restarted.

Figure 3:
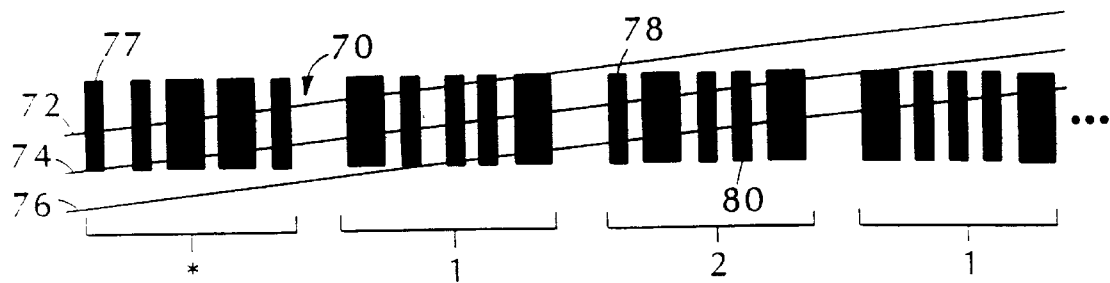
FIG. 3 is a pictorial representation of a portion of a bar code symbol.

Referring to FIG. 3, there is shown, by way of example, the first four characters of a bar code in the Code 39 symbology. A Code 39 character has nine elements, five bars and four spaces, each of which is either narrow or wide. Of the nine elements, three are wide and six are narrow. A Code 39 symbol starts and stops with an asterisk, and can be scanned and read in either direction. Between each character is an inter-character space 70 which can be set to some selected width (the width of which is not significant).

Figure 7:
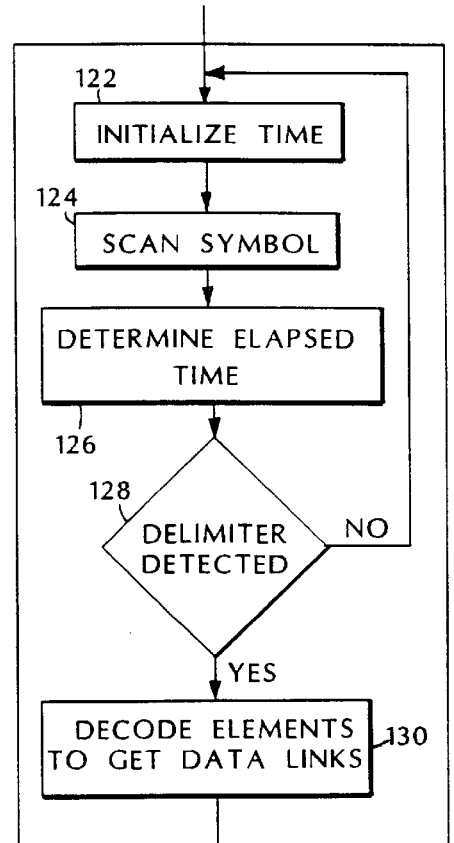

FIG. 7 shows the steps 102 and 104 of obtaining the first and second scans in greater detail.

Referring to FIG. 7 in conjunction with FIG. 3, the decoder initializes the time at 122, loads a scan at 124, and determines the elapsed time at 126. It then determines whether a delimiter character is detected at 128. If not, the decoder resets the time and loads further scans, until a delimiter character is detected. For scan 72, in FIG. 3, the asterisk start/stop character is detected, so the decoder attempts to decode the characters at 130 by loading nine elements at a time, and checking whether these elements represent a valid character. The decoder would load the next nine elements after the asterisk, and successfully decode a numeral "1". But when attempting to decode the next nine elements, the decoder would fail, as it would encounter fewer than nine elements.

In alternate embodiments, the decoder determines the expected length at the initialization step 100 by obtaining a complete scan of a representative bar code symbol and determining its length. This length is then used as the expected length for subsequent scans.

Clock cycles are counted during the scan, so the elapsed time for the scan to reach a particular element is known. The elapsed time between two scans is also known.

Figure 8:
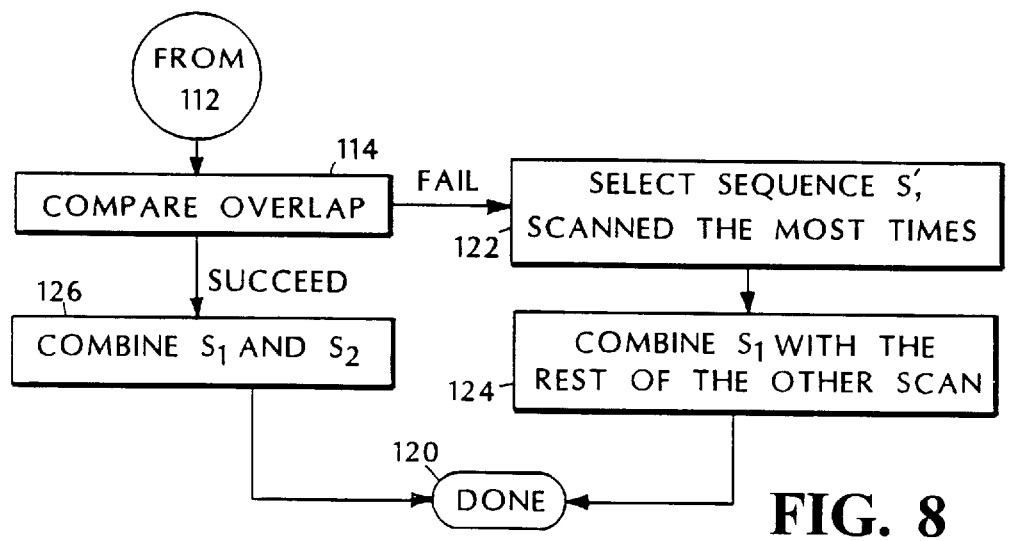

In another embodiment, as shown in FIG. 8, if the comparison of the overlapping portions at 114 fails to determine a match, then, instead of restarting (as in the embodiment shown in FIG. 6), the system selects the sequence of data characters that was scanned the most times (or most recently) at 122, and combines it with the non-overlapping part of the other sequence.

The size in characters of the overlapping portion, Loverlap, can be determined, for example, by the formula:

$$L_{overlap} = (L_{S1} + L_{S2}) - L_p$$

Thus, if, for example, $S_1$ is selected at 122 as the sequence scanned the most times, then the data characters in $S_1$ are combined with the non-overlapping ($L_{S2} - L_{overlap}$) data characters of $S_2$.

Figure 9:
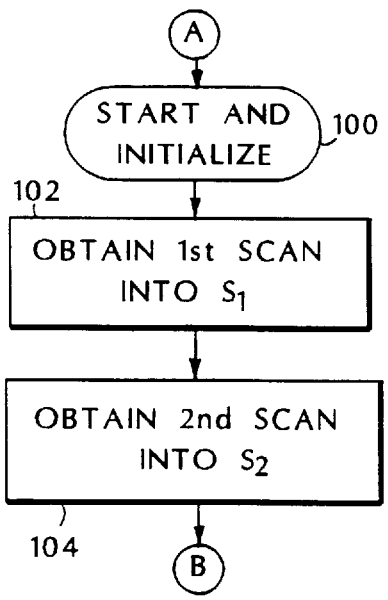
Figure 10:
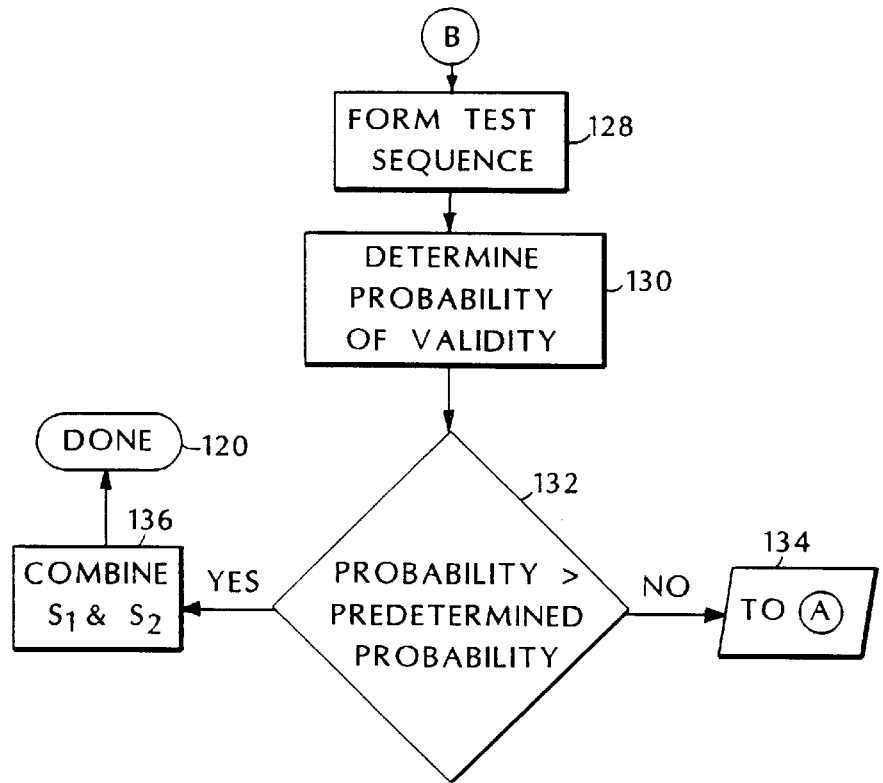

Referring to FIGS. 9–10, in another embodiment, the initialization at step 100 includes setting a global variable corresponding to an acceptable probability value. Then, after the two partial sequences of data characters, corresponding to two decoded partial scans, are obtained (at 102 and 104), a test sequence of the two partial sequences is formed at 128. The probability that the test sequence is a valid character sequence is determined at 130, and compared to the acceptable probability value at 132. If the comparison finds that test character sequence to have an acceptable probability of validity then the two partial sequences are combined at 136 and processing is done at 120. If the probability is not acceptable then two new scans are obtained at 134.

The probability of validity may, for example, be based on the likelihood of two characters being adjacent within the test sequence. This likelihood may depend on the particular encoding symbology used. The test sequence may, for example, be formed by concatenation, combining overlapping portions, or some other means. The embodiment of FIGS. 9–10 has the advantage that it can be applied to symbols of variable character length.

Figure 11:
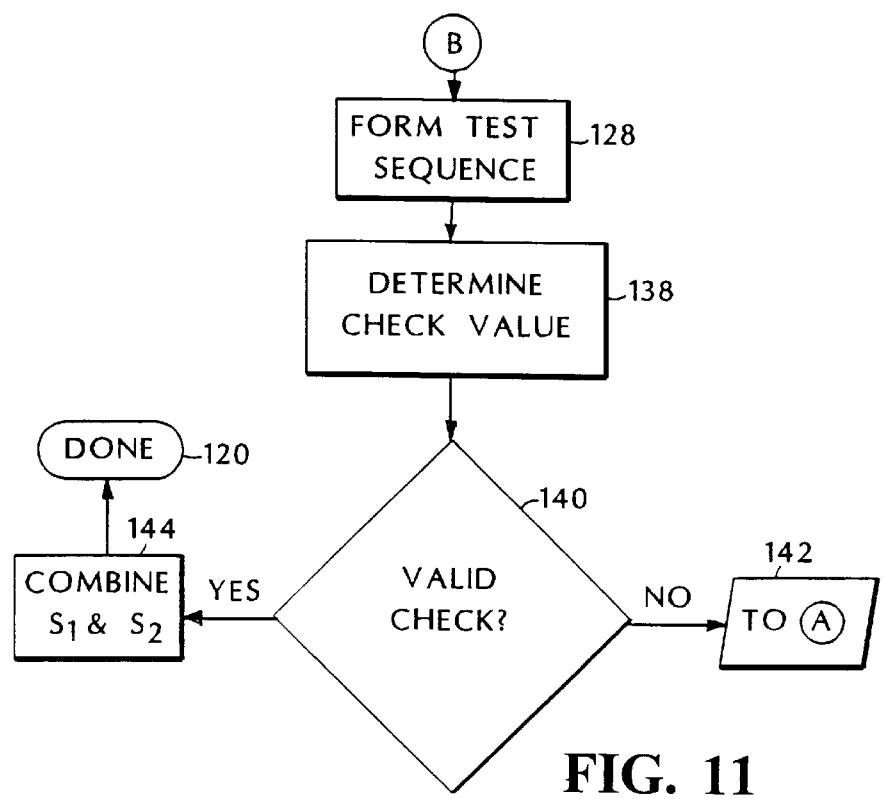

Referring to FIGS. 9–11, in yet another embodiment, after the initialization step 100, and after the two partial sequences of data characters, corresponding to two decoded partial scans, are obtained (at 102 and 104), a test sequence of the two partial sequences is formed at 128. Then a check value, for example, a checksum, of the test sequence is determined at 138. If the check value is determined to be a valid check value at 140, then the two partial sequences are combined at 144 and processing is done at 120. If the check value is not valid then new scans are obtained at 134.

The check value may, for example, be part of the code's symbology (for example, Code 128 uses a check digit), or it may be a user-encoded value. As with the previous embodiment, the test sequence may be formed by concatenation, combining overlapping portions, or some other means.

The previous two embodiments may be combined to give an embodiment in which both a check value and a probability of validity are determined.

Yet a further embodiment of the invention will now be described, with reference to FIGS. 12 to 15. In this embodiment, the current best version of the stitched, decoded scan is maintained in an update able buffer called the stitching buffer. Corresponding to the stitching buffer there are one or more redundancy buffers which maintain information on the reliability of each of the decoded characters in the stitching buffer. To determine whether or not the characters which are stored in the stitching buffer represent an acceptable decode of the bar code symbol which has been scanned, various user-defined tests can be carried out on the information in the corresponding redundancy buffer. Only if the tests are passed will the system advise the user that the bar code symbol has successfully been scanned.

For the purposes of discussion, it will be assumed that we wish to decode a bar code symbol having a known, fixed character length X. As with the previous embodiments, the length X relates to the expected number of characters in the decoded symbol, and not to the number of bars and/or spaces in the symbol itself.

In order to store the information, character by character, from the incoming partial decodes or scans, the system maintains a stitching buffer SB(i) where i runs from 0 to X–1. Corresponding to the stitching buffer SB(i), there are four redundancy buffers: a number buffer N(i), a forward buffer F(i), a backward buffer B(i), and a conflict buffer C(i). In each case, the i runs from 0 to X–1. The number buffer N(i) will contain information about how often each character in the stitching buffer SB(i) has been decoded, while the forward buffer F(i) and backward buffer B(i) record whether the corresponding character in the stitching buffer has been decoded respectively in the forward direction and in the backward direction. The C(i) records whether the current character decoded is different from the corresponding character in the SB(i).

Each cell in the stitching buffer SB(i) will contain a single decoded character, typically an ASCII character. Each cell in the number buffer N(i) will contain an integer. Each cell in the forward and backward buffers F(i), B(i) will contain either a 1 or a 0 according as the corresponding entry in the stitching buffer has or has not been decoded in the forward or rearward direction, respectively. The conflict buffer C(i) will contain a 1 for indicating that the current character decoded is different from the corresponding character in the SB(i); otherwise, a 0 will be stored.

Figure 12:
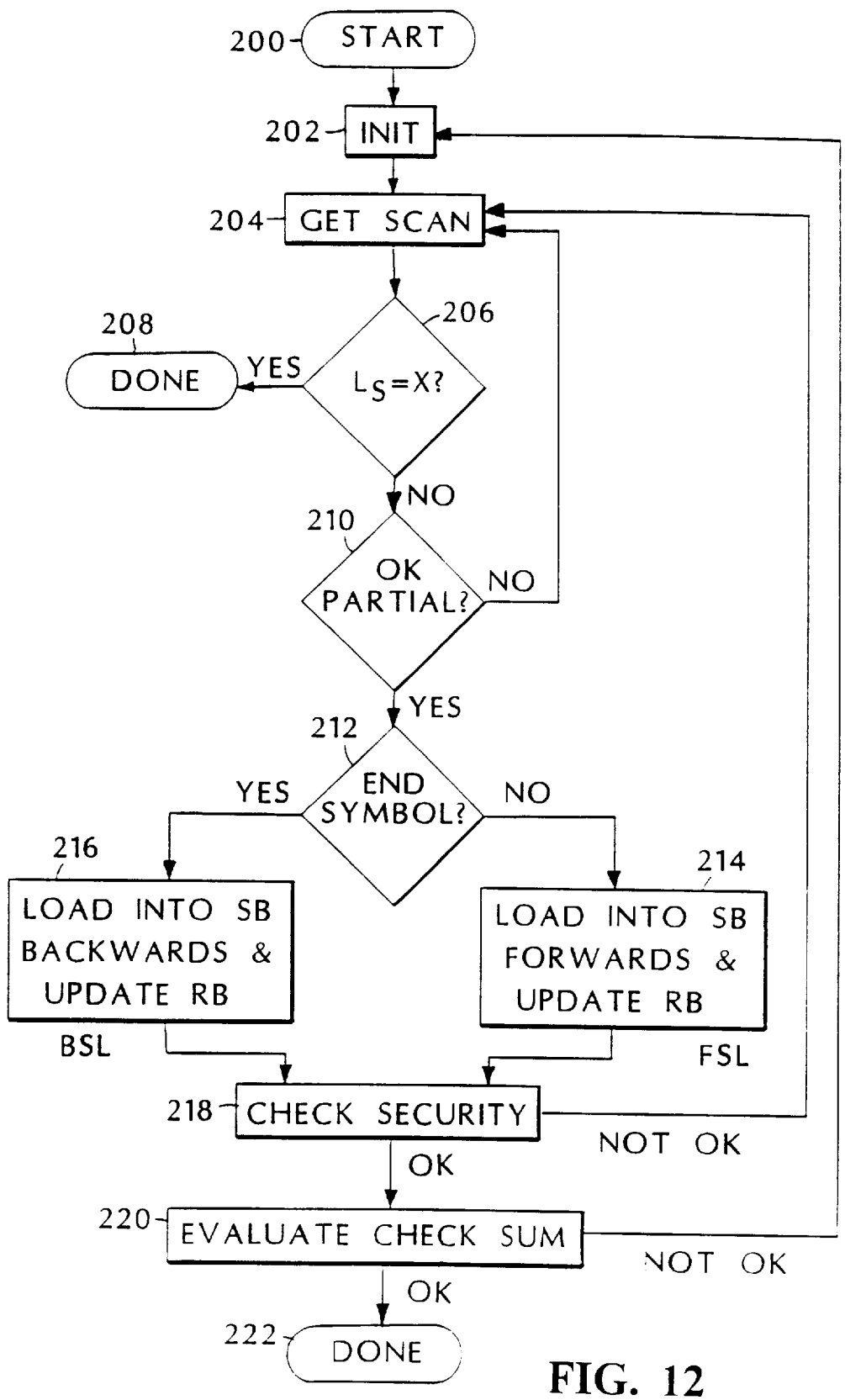
FIGS. 12 and 13 are flow charts of yet a further embodiment.

Turning now to FIG. 12, there is shown a flow diagram illustrating, in simplified form, how the various buffers are used in practice. From the START 200, the system first initialises itself by pre-setting the buffers. Typically, the buffers N(i), F(i), B(i) and C(i) will all be preset to zero, whereas each cell of the stitching buffer SB(i) will be set to a distinctive non-data value such as FF(hex). A scan across the bar code symbol is then obtained at step 204, and the length of the scan $L_s$ is checked against X, the expected decode length, at step 206. If $L_s$ is equal to X, then the scan must have extended across the entire bar code symbol, and stitching is clearly not needed: see step 208. At this point the conventional checks, not shown, may be carried out, such as determining the check sum of the completed scan.

If the length of the scan is less than X, the partial decode is checked at step 210 to determine whether it is suitable to be used as part of the stitching process. To be acceptable for this purpose, in the present embodiment, the partial decode has to contain either the START character or the END character. If it contains neither, a further scan is sought, at step 204.

If the partial decode does contain a START symbol or an END symbol, we may have to determine at step 212 which it is, so that the partial decode can be loaded correctly into the stitching buffer. If there is no END symbol present (but there is a START symbol) the partial decode is loaded character by character into the stitching buffer SB(i), the first character going into SB(0) and the last into SB($L_s$–1). On the other hand, if the partial decode includes the END symbol, but no START symbol, the partial decode is loaded backwards into the stitching buffer, starting at SB(X–1) and ending at SB(X–$L_s$–1).

In each case, as the stitching buffer is updated the entries in the redundancy buffers N(i), F(i), B(i) and C(i) are likewise updated. This will be described in more detail below, with reference to FIG. 13, but briefly N(i) is set to 1 for each value of i corresponding to a sample which has just been filled in FB(i) to indicate that each of those characters has been read once. If the partial decode was in the forward direction (in other words if it included the START character) then all of the corresponding cells of F(i) are also set to 1 to indicate that the characters have been read in the forward direction. If, on the other hand, the partial decode has been read in the backward direction (in other words if the partial decode includes the END character) then instead the corresponding cells of B(i) are set to 1.

At step 218 of FIG. 12, a security check is undertaken to determine whether the characters which are currently stored in the stitching buffer constitute an acceptable decode of the entire bar code symbol which has been scanned. At this point, the test will clearly fail as we have either a partial decode starting with the START code, or a partial decode ending with the END code, but not both.

We therefore return to step 204, and a further scan is obtained. It is possible that this new scan may come from the end of the bar code symbol which has not so far been read. Following through the steps again, it may be seen that this new partial scan will be loaded into the stitching buffer along with the original scan, to form a composite "stitched" scan which includes both a START code and an END code.

If the security tests for the stitched scan (detail of which will be given below) are acceptable, control passes to step 220 where final checks, such as for example the determination of a check sum, are carried out. If the check sum test passes, the system advises the user, at step 222, that the bar code symbol has been scanned. Otherwise, the system re-initialises and tries again to obtain a satisfactory series of partial scans.

Figure 13:
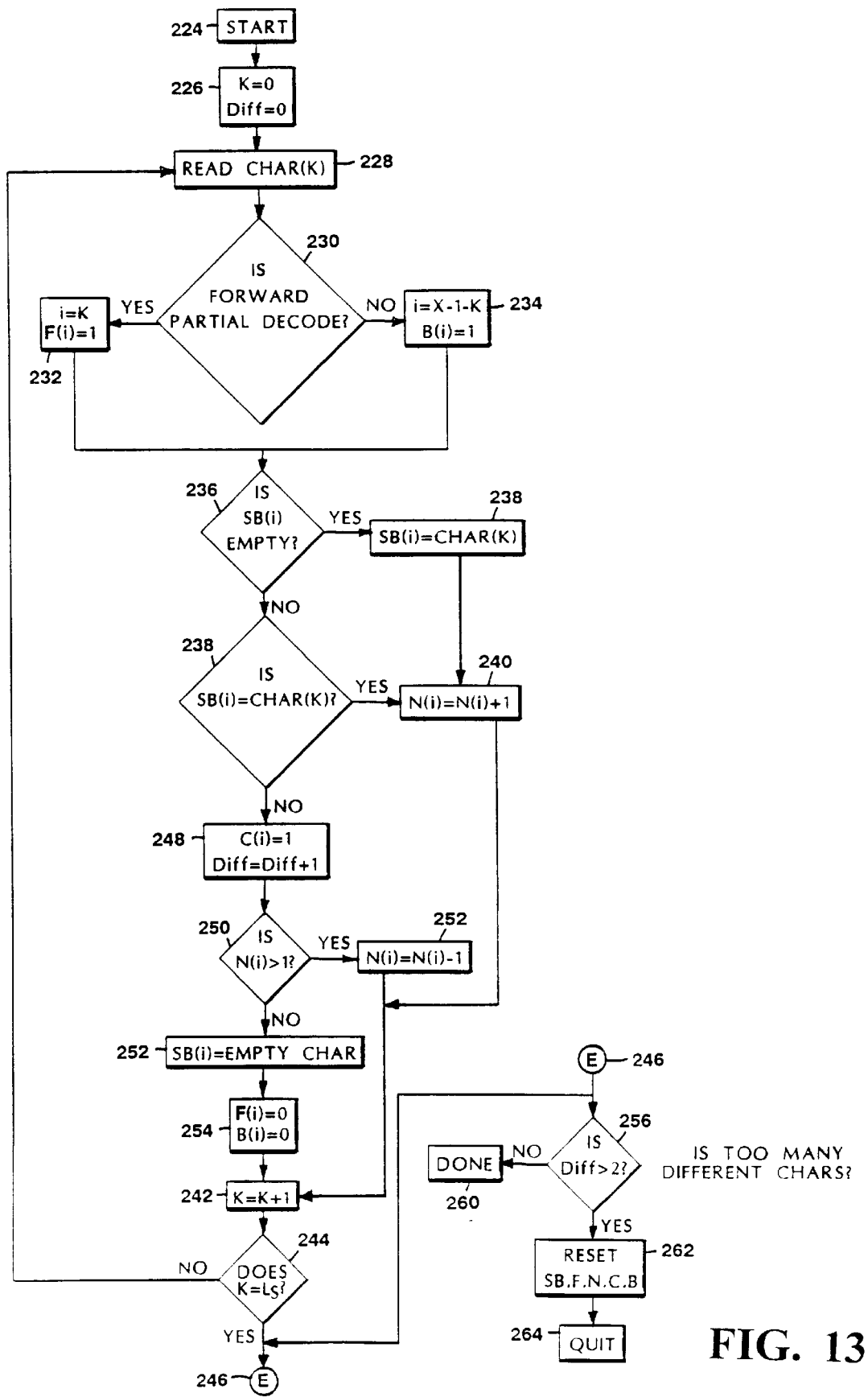

Referring to FIG. 13, further details will now be given of the way in which the redundancy buffers N(i), F(i), B(i), and C(i) are updated as the partial decodes are loaded into the stitching buffer. Further 13 essentially describes, in more detail, what happens at steps 214 and 216 of FIG. 12.

Starting at step 224 in FIG. 13, the system first sets the variables K and Diff to zero at step 226. K represents a counter for the current character position, and the variable Diff will be used to count how many different characters have been found, at the current position, by comparing the current partial decode and the stitching buffer.

At step 228 the first character CHAR(K) in the partial decode is considered. A test is then made at step 230 to determine whether this is a forward or a backwards decode. If it is a forward decode, control passes to step 232, where a variable i is set to K, and F(i) is set to 1. On the other hand, if we are dealing with a backwards decode, control passes to step 234, where i is set to be equal to X–1–K and B(i) is set to 1.

At step 236, a test is made to see whether the current value of SB(i) is empty. If so, then this particular character position has not previously been decoded, and at step 238 the value of SB(i) is set to CHAR(K). The value of N(i) is then incremented by 1 at step 240, and K is incremented by 1 at step 242. If it is determined at step 244 that there are more characters to be read, control passes back to step 228, and the process is repeated. Otherwise, control passes to that portion 246 of the algorithm labelled E. This will be described in detail below.

Returning now to step 236, if it is determined at that point that SB(i) is not empty, we are in the situation where this particular character has previously been decoded. If the character which has just been read, CHAR(K), is equal to the value SB(i) in the stitching buffer (as tested at step 238), it is clear that the character has been decoded in the same way as previously. In that event, control passes to step 240, and the value of N(i) is simply incremented by 1. The process then continues as described above.

If, on the other hand, the test at step 238 is failed, control passes to step 248, where the value of C(i) is set to 1, and the value of Diff is incremented by 1. The setting of C(i) to 1 means that the current character position has been translated in several different ways. This information will be useful when the subsequent security check is performed, providing us with a history of each cell of the stitching buffer. As previously mentioned, the purpose of the variable Diff is to count how many different characters have been found.

At step 250, a test is made to see whether N(i) is greater than 1. If so, no change is made to the stitching buffer, but at step 252, N(i) is simply decremented by 1, and control passes to step 242.

If the test at step 250 determines that N(i) is not greater than 1, the value of SB(i) is set at step 252 to the empty character. Next, at step 254, the values of F(i) and B(i) are both reset to zero, before control is passes to step 242.

Once all the characters in the partial decode have been dealt with, control passes to the completion section E, designated in FIG. 13 with reference numeral 246. At step 256, a security check is carried out to determine whether the current value of the variable Diff is greater than 2. If it is not, the partial decode is considered to be correctly decoded, and control passes to step 260. Information may now be passed back to the calling routine to indicate that the partial decode has been successfully dealt with. If the value of Diff is 2 or greater, then the partial decode is not considered acceptable. At step 262, all of the buffers and variables are reset to the system initial values, and at step 264 control is returned to the calling routine with an indication that the decode has not been successful. At that point, an attempt may typically be made to decode a further scan across the bar code symbol.

It will be evident to the skilled man how to incorporate the above algorithm into a computer program. FIG. 16 shows some exemplary generic code.

Turning back to FIG. 12, an additional function carried out at steps 214 and 216, but not separately illustrated in FIG. 13, is the updating of two variables called forward segment length (FSL) and backward segment length (BSL). FSL represents the length of the longest forward partial scan that has been decoded to date, and BSL the length of the longest backward partial scan. Both BSL and FSL are initially set to 0 at the initialising step 202.

Two specific examples will now be described showing how the system works in practice. FIG. 14 illustrates the stitching of several correctly-decoded partial scans into an acceptable decode of the entire bar code symbol, whereas FIG. 15 shows what happens when some of the characters are decoded incorrectly.

Turning first to FIG. 14, three successive partial scans are shown. In each case, the recovered partial decode is shown in the top line, labelled PD. Below that is the stitching buffer SB, and below that the number, forward and backward buffers N, F and B.

It will of course be understood by the skilled man in this field that it is not, strictly speaking, necessary to maintain separate buffers N(i), F(i) C(i) and B(i). All three could, if desired, be combined into a single redundancy buffer RB(i). There are of course many ways in which the single redundancy buffer RB could take the place of the three separate buffers N, F and B. In the example shown, each cell i in the redundancy buffer RB contains a hex value. Bit 7 of that value is set to 1to correspond to F(i)=1; bit 6 is set to1 to correspond to B(i)=1; bit 5 is set to1to correspond to C(i)=1; and bits 0–4 are counters which are used in replacement for the value in N(i). While the use of encoded hex values in this manner is computationally efficient, it does not promote easy understanding of the principles, and hence in the description below it will be assumed that separate redundancy buffers N, F, B and C are to be used.

In these examples, it will further be assumed that the expected decode length is 18 (in other words X=18), that "68" represents the START character and "80" represents the STOP character.

In the first scan of FIG. 14, the partial decode has 15 characters. Since the first of these is "68" the START character, the partial decode is loaded, from the low end, into the stitching buffer SB. Note that SB(15) to SB(17) still retain their initialised values of FF(hex). The corresponding values of N and F are set to 1 to indicate that character positions 0–14 have been read once in the forward direction. The forward segment length FSL is set to 15.

The second scan produces a partial decode of seven characters, starting with the STOP character 80. Since the STOP character "80" is present, the characters of the partial decode are loaded in reverse order into the stitching buffer, starting at SB(17) and working backwards. Character positions 11–14 have been decoded as before and hence have now been read twice. Accordingly, cells N(11) to N(14) are all set to 2. N(15) to N(17) are now all set to 1. In addition, cells B(11) to B(17) are all set to 1, to indicate that each of these characters have been read backwards.

The backward segment length is set to 7.

The third scan produces four characters, commencing with the STOP character "80". The string would therefore normally be loaded backwards into the stitching buffer, starting at SB(17); however, there is no need to do that in the present case as each of the four values in question has already been decoded. Accordingly, all that happens is that the values of N(14) to N(17) are all incremented by 1. The value of BSL remains at 7, since the current length is 4, which is less than the previous values of 7.

If necessary, further scans (not shown) are carried out until an acceptable level of certainty is obtained as to the values in the stitching buffer. Details of how that may be achieved will be described below.

FIG. 15 corresponds exactly to FIG. 14 except that the last character in each of the partial scans 2 and 3 is assumed to be misread. These are indicated in the drawing with arrows.

After the second scan, the decoded characters are loaded backwards into the stitching buffer, as before, starting at SB(17). However, when SB(11) is reached, it is evident that the character that has just been read ("61") differs from the character ("63") which is already in the buffer. The C(i) is set to 1 to indicate this situation. Since N(11) was previously 1, that cell is, in accordance with the rules previously described, reset to 0, along with F(11) and B(11). Since the previous value of N(11) was 1, the value of SB(11) is set to the empty character (0xff).

In the third scan, the fourth character is misread as "02", rather than "01". When the partial decode is loaded backwards into the stitching buffer, it will be seen that the current character "02" does not match the correspondingly previously read character in SB(14), which was "01". Since the previous value of N(14) was 2, that value is simply decremented to 1, and SB(14) is left untouched.

It will be seen that after the third scan, the stitching buffer contains one incorrect value, at SB(11). SB(14) remains correct, even though the corresponding character has been misread once.

Referring back to FIG. 12, it will be recalled that before the values in the stitching buffer can be accepted as a correct decode, a security check at step 218 has to be carried out. The details of that security check will now be described, with particular reference to the examples of FIGS. 14 and 15.

In order to pass the security check, four separate tests have to be passed:
1. There must be a predefined minimum number of characters in the overlap region between the forward partial decode and the reverse partial decode.
2. In the overlap area, each of the characters must have been decoded in both directions.
3. Each of the characters in the overlap area must have been decoded a certain minimum number of times.
4. Each of the characters outside the overlap area must have been decoded a certain minimum number of times.

The overlap may be calculated by the equation:

$$overlap = FSL + BSL + X$$

From example 1, we obtained the following conclusions if the first condition is that the minimum overlap is 2, the third is that characters inside the overlap area must be decoded at least twice, and the fourth that characters outside the overlap area must be decoded at least once.

The overlap is 4 (7+15−18); all the characters in the overlap area, SB(11) to SB(14), have been decoded at least twice; all the characters outside the overlap area have decoded at least once; and all the characters inside the overlap area have been decoded both forwards and backwards.

All of the tests have been passed, and accordingly the system will advise the user that the bar code symbol has been read in its entirety, with the corresponding characters those which are in the stitching buffer after the third scan.

The tests set out above will not be passed, for FIG. 15, since not all of the characters in the overlap area SB(11) to SB(14) have been decoded in both directions; and there is one character in the overlap area which has been decoded only in one direction.

Since the tests have not been passed, the system will continue trying, obtaining further partial scans and applying the tests again before advising the user that the bar code has correctly been decoded.

It will be appreciated that the embodiment of FIGS. 12 to 15 may be used in conjunction with any one of the previous embodiments, or any combination of them. In particular, this embodiment may incorporate the features previous discussed concerning the check value, and the features concerning the probability of validity.

It will further be understood that many other variations and embodiments will occur to the skilled man and that those variations and embodiments, and others which can fairly be said to be within the spirit and scope of the present invention are intended to be comprehended by the following claims.

We claim:

1. A method for combining scan fragments of a bar code symbol composed of a plurality of bar code elements representing an ordered sequence of data characters, wherein the ordered sequence is delimited by a first delimiting character and a second delimiting character, the method comprising the steps of:
   (A) scanning the symbol along a plurality of scan paths and decoding the scanned elements to obtain decoded sequences of characters;
   (B) determining whether the decoded sequences of characters includes one of the first and second delimiting characters;
   (C) repeating the scanning and determining steps until at least a first decoded sequence with the first delimiting character and a second decoded sequence with the second delimiting character are found;
   (D) combining the first and second sequences of data characters to form a test sequence of data character, wherein the alignment of the first and second sequences in forming the test sequence is based on the locations of the first and second delimiting characters within the first and second decoded sequences;
   (E) determining a probability measure that the test sequence is a valid sequence of data characters; and
   (F) in the event that the probability measure exceeds a predetermined safe probability, combining the first and second sequences of data characters to produce the ordered sequence of data characters.

2. The method of claim 1, further comprising the step of:
   in the event that the probability is less than the predetermined safe probability, repeating steps (A) through (F).

3. A method for combining decoded scan fragments of a bar code symbol composed of a plurality of bar code elements representing an ordered sequence of characters, the ordered sequence having a predetermined length and having a location character whose position within the sequence is known, the method comprising the steps of:
   (a) providing a stitching buffer, the stitching buffer having a plurality of cells, each cell being arranged to contain a value representative of a character in the ordered sequence;
   (b) providing a reliability buffer having a plurality of cells, each cell in the reliability buffer corresponding to a cell in the stitching buffer, and each cell in the reliability buffer being arranged to contain a value representative of the expected reliability of the value contained in the corresponding stitching buffer cell;
   (c) scanning the symbol along a scan path and decoding the scan elements to obtain a decoded sequence of characters; and repeating the scanning and decoding until a decoded sequence is obtained which includes the location character;
   (d) loading the decoded sequence into the stitching buffer in a sequence of location dependent upon the known position of the location character within the ordered sequence; and storing reliability information in those cells of the reliability buffer which correspond to the sequence of locations in the stitching buffer;
   (e) scanning the symbol along a scan path and decoding the scan elements to obtain a further decoded sequence of characters; and repeating the scanning and decoding until a further decode sequence is obtained which includes the location character;
   (f) determining from the known position of the location character within the ordered sequence, a further sequence of locations within the stitching buffer corresponding to the further decoded sequence and, for each character in the further decoded sequence;
      dependent upon the reliability information in the corresponding reliability buffer cell, storing a value representative of the character in the corresponding stitching buffer cell or updating the cell or not updating the cell; and updating the reliability information;
   (g) repeating steps (e) and (f) until each cell in the stitching buffer contains a value representative of a decoded character; and
   (h) when each cell in the stitching buffer contains a value representative of a decoded character, determining whether the decoded characters correspond to the said ordered sequence, at least partially according to the information stored in the reliability buffer;
   wherein the location character comprises a delimiting character;
   wherein there are two delimiting characters; a start character and an end character; and
   wherein a forward segment length value is maintained, representative of the longest decoded sequence or further sequence to date containing the start character; and a backward segment length value is maintained, representative of the longest decoded sequence or further sequence to date containing the end character.

4. The method of claim 3 wherein, at step (h), the determination depends at least partially on the most recent values of the forward segment length and the backward segment length.

5. The method of claim 33 wherein, at step (h) the determination depends at least partially on whether the sum of the forward segment length and the backward segment exceeds a predetermined value.

6. The method of claim 4 wherein, at step (h) the determination depends at least partially on whether each of the characters represented by the values stored in the stitching buffer have been decoded in the way a predetermined minimum number of times.

7. A method for combining decoded scan fragments of a bar code symbol composed of a plurality of bar code elements representing an ordered sequence of characters, the ordered sequence having a predetermined length and having a location character whose position within the sequence is known, the method comprising the steps of:
   (a) providing a stitching buffer, the stitching buffer having a plurality of cells, each cell being arranged to contain a value representative of a character in the ordered sequence;

(b) providing a reliability buffer having a plurality of cells, each cell in the reliability buffer corresponding to a cell in the stitching buffer, and each cell in the reliability buffer being arranged to contain a value representative of the expected reliability of the value contained in the corresponding stitching buffer cell;

(c) scanning the symbol along a scan path and decoding the scan elements to obtain a decoded sequence of characters; and repeating the scanning and decoding until a decoded sequence is obtained which includes the location character;

(d) loading the decoded sequence into the stitching buffer in a sequence of location dependent upon the known position of the location character within the ordered sequence; and storing reliability information in those cells of the reliability buffer which correspond to the sequence of locations in the stitching buffer;

(e) scanning the symbol along a scan path and decoding the scan elements to obtain a further decoded sequence of characters; and repeating the scanning and decoding until a further decode sequence is obtained which includes the location character;

(f) determining from the known position of the location character within the ordered sequence, a further sequence of locations within the stitching buffer corresponding to the further decoded sequence and, for each character in the further decoded sequence;
   dependent upon the reliability information in the corresponding reliability buffer cell, storing a value representative of the character in the corresponding stitching buffer cell or updating the cell or not updating the cell; and updating the reliability information;

(g) repeating steps (e) and (f) until each cell in the stitching buffer contains a value representative of a decoded character; and (h) when each cell in the stitching buffer contains a value representative of a decoded character, determining whether the decoded characters correspond to the said ordered sequence, at least partially according to the information stored in the reliability buffer;

wherein the location character comprises a delimiting character;

wherein there are two delimiting characters; a start character and an end character; and wherein, at step (h), the determination depends at least partially on whether each of the characters in an overlap area have been decoded in the same way a predetermined minimum number of times, the overlap area being defined as those characters which have been decoded, independently, both as part of the longest decoded sequence to date containing the start character, and the longest decoded sequence to date containing the end character.

8. A method for combining decoded scan fragments of a bar code symbol composed of a plurality of bar code elements representing an ordered sequence of characters, the ordered sequence having a predetermined length and having a location character whose position within the sequence is known, the method comprising the steps of:

(a) providing a stitching buffer, the stitching buffer having a plurality of cells, each cell being arranged to contain a value representative of a character in the ordered sequence;

(b) providing a reliability buffer having a plurality of cells, each cell in the reliability buffer corresponding to a cell in the stitching buffer, and each cell in the reliability buffer being arranged to contain a value representative of the expected reliability of the value contained in the corresponding stitching buffer cell;

(c) scanning the symbol along a scan path and decoding the scan elements to obtain a decoded sequence of characters; and repeating the scanning and decoding until a decoded sequence is obtained which includes the location character;

(d) loading the decoded sequence into the stitching buffer in a sequence of location dependent upon the known position of the location character within the ordered sequence; and storing reliability information in those cells of the reliability buffer which correspond to the sequence of locations in the stitching buffer;

(e) scanning the symbol along a scan path and decoding the scan elements to obtain a further decoded sequence of characters; and repeating the scanning and decoding until a further decode sequence is obtained which includes the location character;

(f) determining from the known position of the location character within the ordered sequence, a further sequence of locations within the stitching buffer corresponding to the further decoded sequence and, for each character in the further decoded sequence;
   dependent upon the reliability information in the corresponding reliability buffer cell, storing a value representative of the character in the corresponding stitching buffer cell or updating the cell or not updating the cell; and updating the reliability information;

(g) repeating steps (e) and (f) until each cell in the stitching buffer contains a value representative of a decoded character; and (h) when each cell in the stitching buffer contains a value representative of a decoded character, determining whether the decoded characters correspond to the said ordered sequence, at least partially according to the information stored in the reliability buffer;

wherein the location character comprises a delimiting character;

wherein there are two delimiting characters; a start character and an end character; and wherein, at step (h), the determination depends at least partially on whether the number of characters in an overlap area exceeds a predetermined minimum, the overlap area being defined as those characters which have been decoded, independently, both as part of the longest decoded sequence to date containing the start character, and the longest decoded sequence to date containing the end character.

9. A method for combining decoded scan fragments of a bar code symbol composed of a plurality of bar code elements representing an ordered sequence of characters, the ordered sequence having a predetermined length and having a location character whose position within the sequence is known, the method comprising the steps of:

(a) providing a stitching buffer, the stitching buffer having a plurality of cells, each cell being arranged to contain a value representative of a character in the ordered sequence;

(b) providing a reliability buffer having a plurality of cells, each cell in the reliability buffer corresponding to a cell in the stitching buffer, and each cell in the reliability buffer being arranged to contain a value representative of the expected reliability of the value contained in the corresponding stitching buffer cell;

(c) scanning the symbol along a scan path and decoding the scan elements to obtain a decoded sequence of characters; and repeating the scanning and decoding until a decoded sequence is obtained which includes the location character;

(d) loading the decoded sequence into the stitching buffer in a sequence of location dependent upon the known position of the location character within the ordered sequence; and storing reliability information in those cells of the reliability buffer which correspond to the sequence of locations in the stitching buffer;

(e) scanning the symbol along a scan path and decoding the scan elements to obtain a further decoded sequence of characters; and repeating the scanning and decoding until a further decode sequence is obtained which includes the location character;

(f) determining from the known position of the location character within the ordered sequence, a further sequence of locations within the stitching buffer corresponding to the further decoded sequence and, for each character in the further decoded sequence;

dependent upon the reliability information in the corresponding reliability buffer cell, storing a value representative of the character in the corresponding stitching buffer cell or updating the cell or not updating the cell; and updating the reliability information;

(g) repeating steps (e) and (f) until each cell in the stitching buffer contains a value representative of a decoded character; and (h) when each cell in the stitching buffer contains a value representative of a decoded character, determining whether the decoded characters correspond to the said ordered sequence, at least partially according to the information stored in the reliability buffer;

wherein the location character comprises a delimiting character;

wherein there are two delimiting characters; a start character and an end character; and wherein, at step (h), the determination depends at least partially on whether the characters in an overlap area have all been decoded in the same way both as a result of a scan path in a forward direction and as a result of a scan path in a backward direction, the overlap area being defined as those characters which have been decoded, independently, both as part of the longest decoded sequence to date containing the start character, and the longest decoded sequence to date containing the end character.

* * * * *

UNITED STATES PATENT AND TRADEMARK OFFICE
CERTIFICATE OF CORRECTION

PATENT NO. : 5,821,519

DATED : October 13, 1998

INVENTOR(S) : Kuang-Yuu Lee and Glenn Spitz

It is certified that error appears in the above-identified patent and that said Letters Patent is hereby corrected as shown below:

In the drawings,

FIG. 16, line 16, "equel" should be --equal--.

Col. 1, line 34, "Coda bar" should be --Codabar--.

Col. 4, line 62, "in built" should be --inbuilt--.

Col. 5, line 10, after "of" delete "a".

Col. 5, line 67 "64acovers" should be --64a covers--.

Col. 7, lines 36-37, "Loverlap" should be --$L_{overlap}$--.

Col. 8, line 20, "update able" should be --updateable--.

Col. 8, line 65, "initialises" should be --initializes--.

Col. 9, line 61, "re-initialises" should be --re-initializes--.

Col. 10, line 18, "1at" should be --1 at--.

Col. 10, line 49, "passes" should be --passed--.

Col. 11, line 8, "initialising" should be --initializing--.

Col. 11, line 29, "1to" should be --1 to--.

UNITED STATES PATENT AND TRADEMARK OFFICE
CERTIFICATE OF CORRECTION

PATENT NO. : 5,821,519
DATED : October 13, 1998
INVENTOR(S) : Kuang-Yuu Lee and Glenn Spitz It is certified that error appears in the above-identified patent and that said Letters Patent is hereby corrected as shown below:

Col. 11, line 44, "initialised" should be --initialized--.

Col. 12, line 46, "overlap=FSL+BSL+X" should be --overlap=FSL+BSL-X--.

Col. 13, line 8, "previous" should be --previously--.

Col. 14, line 49, "claim 33" should be --claim 4--.

Col. 14, line 49, after "(h)", insert --,--.

Col. 14, line 53, after "(h)", insert --,--.

Signed and Sealed this

Thirteenth Day of July, 1999

Attest:

Q. TODD DICKINSON

Attesting Officer

Acting Commissioner of Patents and Trademarks